United States Patent
Iannaccone et al.

(10) Patent No.: US 11,676,177 B1
(45) Date of Patent: *Jun. 13, 2023

(54) IDENTIFYING CHARACTERISTICS USED FOR CONTENT SELECTION BY AN ONLINE SYSTEM TO A USER FOR USER MODIFICATION

(71) Applicant: META PLATFORMS, INC., Menlo Park, CA (US)

(72) Inventors: Gianluca Iannaccone, Oakland, CA (US); Matthew Hural, Oakland, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/912,473

(22) Filed: Jun. 25, 2020

Related U.S. Application Data

(63) Continuation of application No. 15/089,464, filed on Apr. 1, 2016, now Pat. No. 10,755,316.

(51) Int. Cl.
 *G06Q 30/0251* (2023.01)
 *G06Q 30/0241* (2023.01)

(52) U.S. Cl.
 CPC ..... *G06Q 30/0269* (2013.01); *G06Q 30/0277* (2013.01)

(58) Field of Classification Search
 None
 See application file for complete search history.

(56) References Cited

U.S. PATENT DOCUMENTS

| | | | |
|---|---|---|---|
| 2012/0041969 A1* | 2/2012 | Priyadarshan | G06Q 30/0201 707/769 |
| 2014/0279722 A1* | 9/2014 | Singh | G06N 5/022 706/11 |
| 2017/0287013 A1* | 10/2017 | Iannaccone et al. | G06Q 30/0269 |

OTHER PUBLICATIONS

Elliot, M. "Adjust Facebook's ad preferences to see better targeted ads." CNET.com. Dec. 10, 2014. Retrieved from the Internet [Nov. 8, 2018], <URL: https://www.cnet.com/how-to/adjust-facebooks-ad-preferences-to-see-better-targeted-ads/> (Year: 2014).*

(Continued)

*Primary Examiner* — Bion A Shelden
(74) *Attorney, Agent, or Firm* — Mannava & Kang, P. C.

(57) ABSTRACT

Content presented to a user of an online system is presented along with an option allowing the user to view one or more reasons for presentation of the advertisement content to the user and one or more characteristics of the user satisfying targeting criteria associated with the content. For example, a description identifying one or more selected characteristics of the user satisfying the targeting criteria is presented along with the content. The online system selects the one or more characteristics presented along with the content by applying one or more rules to characteristics of the user satisfying targeting criteria included in the content. The rules may account for accuracy of models used to determine whether the user has characteristics, revenue received by the online system from presenting content associated with targeting criteria identifying various characteristics, or prevalence of characteristics among users or targeting criteria of content.

20 Claims, 4 Drawing Sheets

(56) References Cited

OTHER PUBLICATIONS

Andreou, A. "Investigating Ad Transparency Mechanisms in Social Media: A Case Study of Facebook's Explanations." Network and Distributed Systems Security (NDSS) Symposium 2018. Retrieved from the internet [Jun. 17, 2021], <URL: https://lig-membres.imag.fr/gogao/papers/fb_ad_transparency_NDSS2018.pdf< (Year: 2018).*

* cited by examiner

IDENTIFYING CHARACTERISTICS USED FOR CONTENT SELECTION BY AN ONLINE SYSTEM TO A USER FOR USER MODIFICATION

PRIORITY

This application is a Continuation of commonly assigned and co-pending U.S. patent application Ser. No. 15/089,464, filed Apr. 1, 2016, the disclosure of which is hereby incorporated by reference in its entirety.

BACKGROUND

This disclosure relates generally to presentation of content by an online system, and more specifically to allowing an online system user to modify characteristics used by the online system to select content for presentation to the user.

An online system allows users to connect to and to communicate with other users of the online system. Users create profiles on an online system that are tied to their identities and include information about the users, such as interests and demographic information. The users may be individuals or entities such as corporations or charities. Content items are presented to various users by the online system to encourage users to interact with the online system.

But as the amount of content provided by the online system increases, users may be presented with an increasing amount of content in which the users have little interest. To provide users with content more likely to be relevant, content items may be associated with targeting criteria specifying characteristics of users eligible to be presented with the content item. This limits presentation of a content item to users having characteristics satisfying the targeting criteria. However, a conventional online system provides a user with limited ability to regulate use of its characteristics by the online system in selecting content for the user.

SUMMARY

An online system selects content items for presentation to a user of the online system based at least in part on characteristics of the user. Various content items include content for presentation to users and targeting criteria identifying characteristics of users eligible to be presented with the content items. Additionally, some content items also include a bid amount specifying an amount of compensation received by the online system for presenting the content items. To select content for presentation to the user, the online system retrieves characteristics associated with the user (e.g., demographic information, interests, actions performed by the user, connections between the user and other online system users, etc.) and compares the characteristics to targeting criteria included in various content items. Content items including at least a threshold number of targeting criteria satisfied by the characteristics associated with the user are identified as eligible for presentation to the user and included in a selection process performed by the online system. However, content items that do not include at least a threshold number of targeting criteria satisfied by characteristics associated with the user are not included in the selection process. Content items selected by the selection process are subsequently presented to the user.

The online system also selects one or more characteristics of the user satisfying targeting criteria included in content items presented to the user based on one or more rules. For example, the online system determines amounts of revenue previously received from presenting content items associated with targeting criteria specifying one or more characteristics of the user satisfying targeting criteria included in a content item and selects one or more characteristics of the user satisfying targeting criteria included in the content item based on the amounts of revenue. As an example, the online system selects a characteristic of the user satisfying targeting criteria included in the content item specified by targeting criteria associated with content items from which the online system received a maximum amount of revenue or received at least a threshold amount of revenue. In other embodiments, the online system selects one or more characteristics of the user satisfying targeting criteria included in a content item that the online system determined were characteristics of the user via one or more models having less than a threshold accuracy in determining whether users have the characteristics. As another example, the online system selects one or more characteristics of the user satisfying targeting criteria included in a content item that are characteristics of at least a threshold number of online system users or that are specified by targeting criteria included in at least a threshold number of content items. However, any suitable rules may be used by the online system to select one or more characteristics of the user satisfying targeting criteria included in content items presented to the user.

To allow the user to regulate selection of content items based on characteristics of the user, when a content item is presented to the user, the online system also presents an option for the user to view the reasons for presentation of the content item. The option may be presented as text data or image data presented in conjunction with the content item. In some embodiments, the online system presents a description of the selected one or more characteristics of the user satisfying targeting criteria included in a content item along with the content item, identifying the selected one or more characteristics to the user when the content item is presented. Alternatively, the online system presents a description of the one or more selected characteristics of the user satisfying targeting criteria included in the content item if the online system receives a selection of the option to view reasons for presentation of the content item. For example, the description identifies the one or more selected characteristics, and may identify the targeting criteria satisfied by the one or more selected characteristics. In some embodiments, the online system presents a description of one or more characteristics of the user selected by the online system via one or more rules in a set of rules in conjunction with the content item but presents a description of one or more characteristics selected by the online system via rules outside of the set of rules in response to receiving a selection of the option to view reasons for presentation of the content item.

An option to prevent subsequent use of the selected one or more characteristics for selecting subsequent content items for presentation to the user is included in the description presented to the user. If the online system receives an input indicating selection of the option or another input from the user to prevent use of the selected one or more characteristics for content item selection, the online system does not identify subsequent content items including targeting criteria satisfied by the selected one or more characteristics as eligible for presentation to the user. The online system stores information associated with the selected one or more characteristics or with targeting criteria satisfied by the selected one or more characteristics to indicate that additional content items including targeting criteria satisfied by the selected characteristics are not eligible for presentation to the user. Additionally, the online system may also allow a user to view multiple characteristics associated with the user and compared to targeting criteria included in content items via an interface and to select characteristics from the interface authorized by the user to be compared to targeting criteria in content items and not authorized by the user to be compared to targeting criteria in content items.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
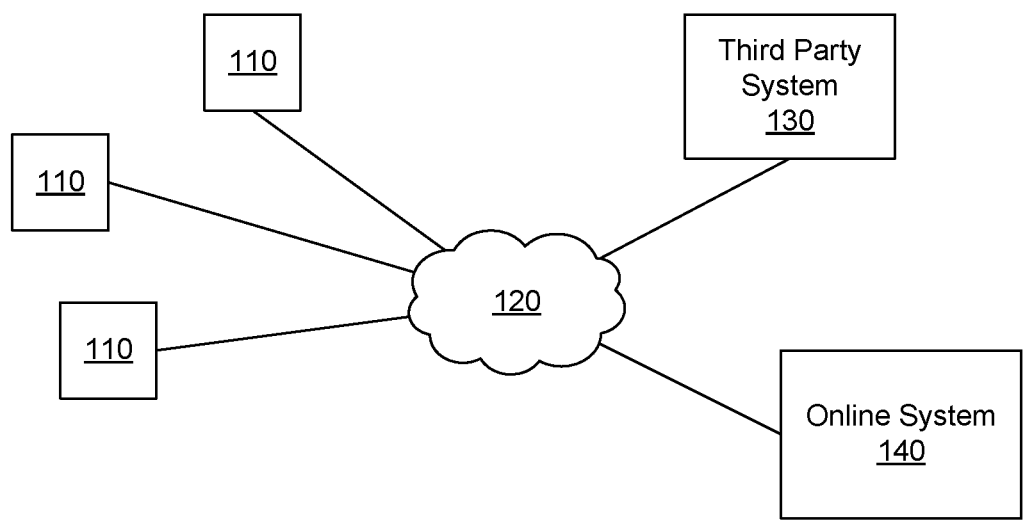
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
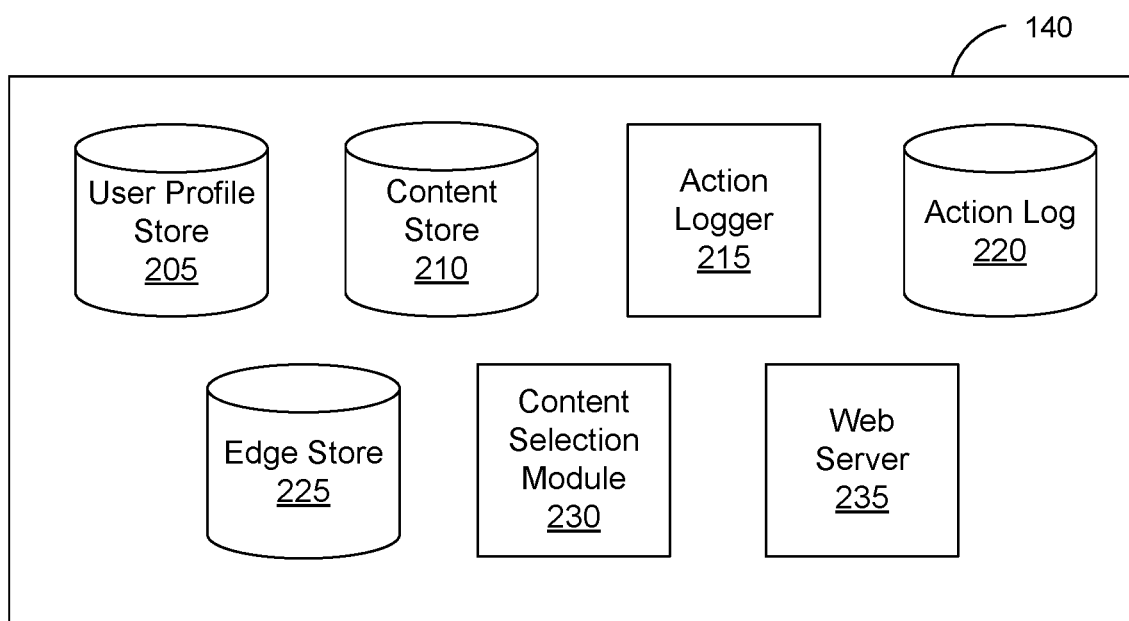
FIG. 2 is a block diagram of an online system, in accordance with an embodiment.

FIG. 2 is a block diagram of an architecture of the online system 140. For example, the online system 140 is a social networking system. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

Content items included in the content store 210 may include content for presentation to users and a bid amount. The content is text, image, audio, video, or any other suitable data presented to a user. In various embodiments, the content also includes a landing page specifying a network address to which a user is directed when the content is accessed. The bid amount is associated with a content item by a user providing the content item to the online system 140 and is used to determine an expected value, such as monetary compensation, provided by the user to the online system 140 if the content item is presented to another user, if the content item receives a user interaction when presented, or if any suitable condition is satisfied when the content item is presented to a user. For example, the bid amount specifies a monetary amount that the online system 140 receives from the user providing the content item to the online system 140 if the content item is displayed. In some embodiments, the expected value to the online system 140 of presenting the content item may be determined by multiplying the bid amount by a probability of the content item being accessed by a user.

Additionally, a content item may include one or more targeting criteria specified by the user providing the content item to the online system 140. Targeting criteria included in a content item specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users who have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows advertisers to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects content items for presentation to a user of the online system 140 based at least in part on characteristics of the user. In one embodiment, the content selection module 230 selects content items for presentation to a user and presents selected content items to the user. To select content items for presentation to the user, the content selection module 230 retrieves characteristics associated with the user from the user profile store 205, the action log 220, or the edge store 225 and compares the characteristics to targeting criteria included in various content items from the content store 210. Content items including at least a threshold number of targeting criteria satisfied by the characteristics associated with the user are identified as eligible for presentation to the user and included in a selection process performed by the content selection module 230. However, content items that do not include at least a threshold number of targeting criteria satisfied by characteristics associated with the user are not included in the selection process.

In one embodiment, the content selection module 230 selects content items for presentation to the user based at least in part on bid amounts associated with content items identified as eligible for presentation to the user. For example, the content selection module 230 determines an expected value to the online system 140 for presenting different content items identified as eligible for presentation to the user. The expected value for presenting a content item is based on the bid amount included in the content item and a likelihood of the user interacting with the content item; for example, the expected value for presenting the content item is a product of the bid amount included in the content item and the likelihood of the user interacting with the content item. In various embodiments, the content selection module 230 ranks content items identified as eligible for presentation to the user based on their associated expected values and selects content items having at least a threshold position in the ranking for presentation to the user. For example, content items having the highest positions in the ranking are selected for presentation to the user.

To allow the user to regulate selection of content items based on characteristics of the user, when advertisement content is presented to the user, the content selection module 230 also presents an option for the user to view the reasons for presentation of a content item, and may also present a description of one or more characteristics of the user satisfying targeting criteria included in the content item. The option is presented as text data or image data presented in conjunction with the content item. Similarly, the description of the one or more characteristics of the user satisfying the targeting criteria may also be presented as text data. The content selection module 230 selects the presented characteristics by applying one or more rules to identified characteristics of the user matching targeting criteria included in the content item. For example, the content selection module 230 determines a score associated with each identified characteristic that provides a measure of expected user comfort with use of the characteristic for selecting content and selects an identified characteristic based on the scores. In one embodiment, the content selection module 230 selects the identified characteristic associated with a score indicating a highest expected user comfort with user of the characteristic to select content. As another example, the content selection module 230 selects identified characteristics that are also characteristics of at least a threshold number of online system users or that are also specified by targeting criteria included in at least a threshold number of content items. The content selection module 230 generates a description based on the selected one or more characteristics satisfying targeting criteria included in the content item and presents the description to the user. For example, the description identifies the one or more selected characteristics, and may identify the targeting criteria satisfied by the one or more selected characteristics. Selection of one or more characteristics and generation of the description is further described below in conjunction with FIG. 3.

An option to prevent subsequent use of the selected one or more characteristics for selecting subsequent content for presentation to the user is included in the description presented to the user. If the content selection module 230 receives an input indicating selection of the option or another input from the user to prevent use of the selected one or more characteristics for content selection, the content selection module 230 does not identify subsequent content items including targeting criteria satisfied by the selected one or more characteristics as eligible for presentation to the user. The content selection module 230 stores information associated with the selected one or more characteristics or with targeting criteria satisfied by the selected one or more characteristics to indicate that additional content items including targeting criteria satisfied by the selected characteristics are not eligible for presentation to the user. Additionally, the content selection module 230 may also allow a user to view multiple characteristics associated with the user and compared to targeting criteria included in content items via an interface and to select characteristics from the interface authorized by the user to be compared to targeting criteria in content items and not authorized by the user to be compared to targeting criteria in content items. User specification of characteristics for comparison to targeting criteria is further described below in conjunction with FIG. 3.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Modifying User Characteristics Used for Advertisement Selection

Figure 3:
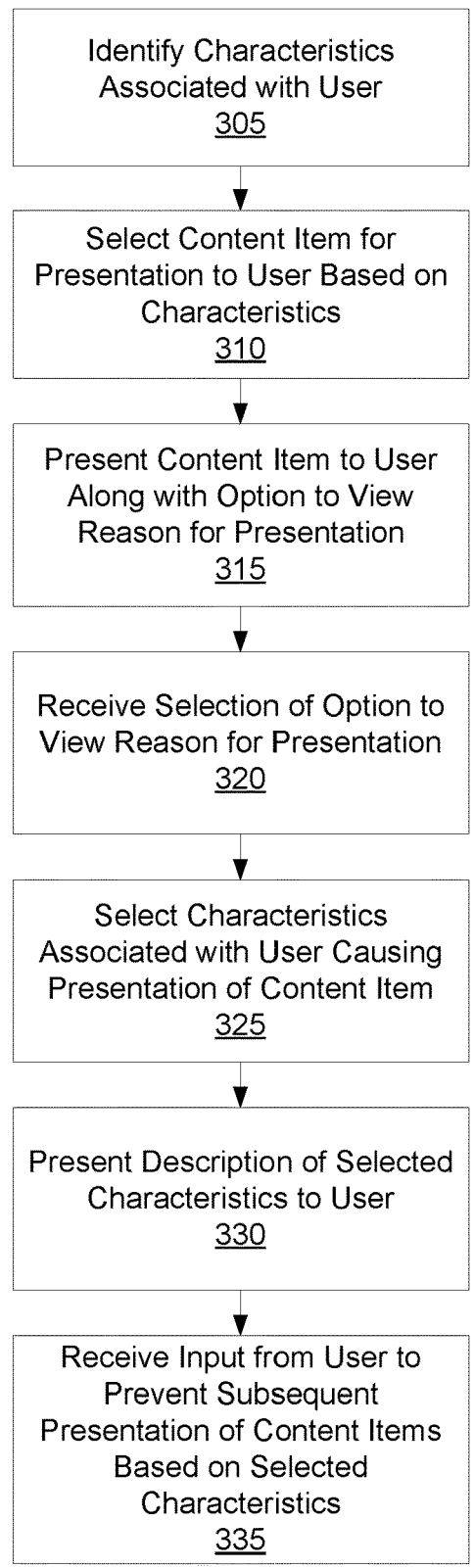
FIG. 3 is a flow chart of a method for modifying characteristics of a user of an online system used for selecting content presented to the user, in accordance with an embodiment.

FIG. 3 is a flowchart of one embodiment of a method for modifying characteristics of a user of an online system 140 used for selecting content presented to the user. In other embodiments, the method may include different and/or additional steps than those described in conjunction with FIG. 3. Additionally, in some embodiments, the method may perform the steps described in conjunction with FIG. 3 in different orders.

The online system 140 receives a content item including targeting criteria from a user. As described above in conjunction with FIG. 2, targeting criteria identifies one or more characteristics of users eligible to be presented with the content item. For example, a user associated with characteristics satisfying at least a threshold number of targeting criteria included in the ad request is eligible to be presented with the content item, while another user that is not associated with characteristics satisfying at least the threshold number of targeting criteria is not eligible to be presented with the content item. The online system 140 stores the received content item.

When the online system 140 identifies an opportunity to present content to a user of the online system 140, characteristics associated with the user by the online system 140 are identified 305 and compared to the targeting criteria included in the received content item. For example, the online system 140 receives a request for content from a client device 110 associated with the user when the user views content via the client device 110. As another example, the online system 140 receives a request for content from a third party system 130 providing content including one or more slots or regions for content items to a client device 110 for presentation to the user. Example characteristics associated with the user include information included in a user profile associated with the user (e.g., age, gender, location, occupation, interests, etc.), actions performed by the user and identified by the online system 140, or connections between the user and one or more additional users of the online system 140. Characteristics associated with the user may be identified 305 from information associated with the user by the online system 140 as well as information associated with the user by one or more third party systems 130.

The online system 140 compares identified characteristics to the targeting criteria included in the content item to determine if the content item is eligible for presentation to the user. For example, the online system 140 determines a characteristic of the user satisfies targeting criteria if the characteristic has a value matching a value specified by the targeting criteria or has a value within a range specified by the targeting criteria. In some embodiments, a characteristic of the user is determined to satisfy targeting criteria if the characteristic has a value specified by the targeting criteria or determined by the online system 140 to be similar to the targeting criteria. If at least a threshold number of the identified characteristics satisfy the targeting criteria, the content item is included in a process that selects content for presentation to the user. In one embodiment, a bid amount included in the content item is retrieved and used by the online system 140 to determine an expected value to the online system 140 for presenting the content to the user. For example, the expected value of the content item is based on a probability of the user interacting with the content item and a bid amount associated with the content item. In this example, the process for selecting advertisement content ranks multiple content items based on their associated expected values and selects content items having at least a threshold position in the ranking for presentation. The selected content items are presented to the user.

If selected 310 by the online system 140, the content item is presented 315 to the user by the online system 140. For example, the content item is communicated to a third party system 130 for presentation 315 in conjunction with content provided by the third party system 130. As another example, the content item is communicated from the online system 140 to a client device 110 for presentation to the user. In conjunction with the content item, a description of the selected one or more characteristics may also be presented to the user. For example, an option is presented 315 in conjunction with the content item for the user to view one or more reasons for presentation of the content item. As an example, the phrase "Why am I seeing this?" is presented 315 in conjunction with the content item.

If the user selects the option to view one or more reasons for presentation of the content item, the online system 140 receives 320 the selection and selects 325 one or more characteristics of the user causing determination of the content item to be eligible for presentation to the user. In some embodiments, the online system 140 selects 325 one or more characteristics of the user that cause the content item to be identified as eligible for presentation to the user automatically. The online system 140 determines the characteristics of the user satisfying the targeting criteria included in the content item and selects 325 one or more of the characteristics of the user satisfying the targeting criteria included in the ad request. In one embodiment, the online system 140 ranks the one or more characteristics of the user satisfying the targeting criteria based on information associated with the characteristics. For example, information describing feedback received from various online system users describing perception of using various characteristics to select content is used to rank the characteristics of the user satisfying the content item's targeting criteria. A characteristic having a maximum position in the ranking is selected 325 in one embodiment, or one or more characteristics having at least a threshold position in the ranking are selected 325 in other embodiments. As another example, a score is associated with each characteristic satisfying the content item's targeting criteria is determined based on the information describing user feedback regarding user of different characteristics for selecting content, and one or more characteristics having at least a threshold score or a characteristic having a maximum (or a minimum) score are selected 325.

In other embodiments, an operator of the online system 140 specifies one or more rules for selecting 325 the one or more characteristics. For example, the rules may provide a hierarchy of types of characteristics, with characteristics having at least a threshold position in the hierarchy selected 325 for presentation. In some embodiments, the operator of the online system 140 specifies rules that identify a hierarchy of types of characteristics based on a perception by the operator of how different types of characteristics provide information to a user about why the advertisement content was presented to the user. Types of characteristics with a higher position in the hierarchy may be determined by the operator to provide users with more descriptive information about reasons for presentation of ad content to the user than types of characteristics a lower position in the hierarchy. In some embodiments, a single characteristic is selected 325 for presentation.

Rules for selecting 325 the one or more characteristics may account for various criteria. For example, the online system 140 determines amounts of revenue received from presenting content items associated with targeting criteria identifying different characteristics during a time interval, and selects 325 characteristics specified by targeting criteria associated with content items from which the online system 140 has received at least a threshold amount of revenue in exchange for presenting. As an example, the online system 140 determines total amounts of revenue received during a time interval from presenting various content items associated with targeting criteria specifying different characteristics, and selects 325 characteristics of the user satisfying targeting criteria associated with the presented content item that were also specified by targeting criteria associated with content items from which the online system 140 received at least a threshold amount of revenue from presenting to users. Alternatively, the online system 140 ranks characteristics of the user satisfying targeting criteria associated with the presented content item based on amounts of revenue received by the online system 140 from presenting various content items also associated with targeting criteria identifying the characteristics of the user satisfying the targeting criteria associated with the presented content item. The online system 140 selects 325 characteristics of the user satisfying targeting criteria associated with the presented content item having at least a threshold position in the ranking (e.g., having a highest position in the ranking). This allows the online system 140 to select 325 one or more characteristics of the user satisfying the targeting criteria causing the content item to be eligible for presentation to the user that have provided the online system 140 with maximum amounts of revenue.

Other rules for selecting 325 the one or more characteristics identify characteristics that are included in a model used to select content for presentation to users (e.g., a model predicting a likelihood of a user interacting with a content item, a model determining an affinity of a user for a content item, a model determining whether a user has a characteristic, etc.) satisfying one or more criteria. For example, a rule selects 325 a characteristic of the user satisfying the targeting criteria causing the content item to be eligible for presentation to the user that is determined by a model having less than a threshold accuracy in determining the characteristic. The accuracy of the model may be determined by surveys presented by the online system 140 to users determined to have the characteristic by application of the model to characteristics of the user; if responses to the surveys by online system users indicate model has less than the threshold accuracy in determining that users have the characteristic, the online system 140 selects the characteristics for presentation in conjunction with the content item. As another example, a rule selects 325 a characteristic of the user satisfying the targeting criteria causing the content item to be eligible for presentation to the user that is determined by a model that has received information from less than a threshold number of users.

As another example, one or more rules select 325 one or more characteristics based on numbers of users having various characteristics or numbers of content items including targeting criteria specifying the characteristics. For example, a rule selects 325 a characteristic of the user satisfying the targeting criteria causing the content item to be eligible for presentation to the user that is a characteristic of at least a threshold number of users. As another example, a rule selects 325 a characteristic of the user satisfying the targeting criteria causing the content item to be eligible for presentation to the user that is identified by targeting criteria in at least a threshold number of content items. Hence, the one or more rules allow the online system 140 to select 325 characteristics capable of increasing a number of users eligible for presentation with the content item (i.e., characteristics that may increase a reach of a content item because they are characteristics of at least the threshold number of users) or capable of increasing a number of content items eligible for presentation to the user (e.g., characteristics included in targeting criteria in greater than a threshold number of content items).

A description of the selected one or more characteristics of the user is generated by the online system 140 and presented 330 to the user along with an option to modify use of the selected one or more characteristics for selecting subsequent content items to be presented to the user. In some embodiments, the option allows the user to prevent user of one or more of the selected characteristics for selecting subsequent content items for presentation to the user. For example, the targeting criteria satisfied by a selected characteristic of the user is presented 330 or a textual description of the targeting criteria satisfied by the selected characteristic of the user is presented 330. As another example, the targeting criteria and a value of the characteristic of the user satisfying the targeting criteria are presented 330 to the user. The description of the selected one or more characteristics may be presented 330 in conjunction with the content item or may be presented in an interface separate from the interface in which the content item is presented.

In some embodiments, one or more of the selected characteristics are presented 315 in conjunction with the content item and the option to modify use of the selected one or more characteristics for selecting content for the user, allowing the user to view the one or more selected characteristics in conjunction with the content item without initially selecting the option to view one or more reasons for presentation of the content item. The one or more selected characteristics may be presented 315 or a textual description of the targeting criteria satisfied by the one or more selected characteristics may be presented in conjunction with the content item in various embodiments. In various embodiments, one or more of the selected characteristics are presented 315 in conjunction with the content item in response to the online system 140 selecting 325 the selected characteristics based on one or more specific rules. For example, the online system 140 maintains a set of rules and presents 315 characteristics selected 325 based on at least one rule in the set of rules in conjunction with the content item; however, characteristics selected 325 based on rules outside of the set of rules. Other criteria may be used by the online system 140 to determine whether to present 315 one or more of the selected characteristics in conjunction with the content item. For example, if the online system 140 maintains less than a threshold number of characteristics associated with the user, the online system 140 presents 315 one or more of the selected characteristics in conjunction with the content item.

To modify characteristics used by the online system 140 for selecting subsequent content items to be presented to the user, the online system 140 receives 335 an input from the user. In various embodiments, different inputs may be received 335 by the online system 140, such as an input to modify one or more of the selected characteristics, an input to associate additional characteristics with the user, or an input to prevent use of one or more of the selected characteristics for selecting subsequent content items for presentation to the user. For example, the user selects the option presented along with the selected one or more characteristics and the one or more selected targeting criteria, causing the online system 140 to receive 335 the input to modify characteristics used to identify content items eligible to be presented to the user. For example, the received input prevents the online system 140 from using the selected one or more characteristics presented 315 in conjunction with the content items for selecting subsequent content to be presented to the user. In response to receiving 335 an input to prevent use of the selected one or more characteristics from selecting subsequent advertisement content for the user, the online system 140 stores information associated with the selected one or more characteristics to prevent their use in subsequent content selection. For example, if the selected one or more characteristics satisfy targeting criteria included in an additional content item, after receiving 335 an input to prevent user of the selected one or more characteristics for selecting subsequent advertisement content to the user, the online system 140 determines the additional content item is ineligible for presentation to the user. Hence, the online system 140 allows the user to easily regulate use of various characteristics of the user when selecting content for presentation to the user.

In some embodiments, the online system 140 presents the user with an option to modify characteristics of the user compared to targeting criteria included in content items. When the online system 140 receives a selection of the option to modify characteristics compared to targeting criteria, the online system 140 presents an interface including a subset of characteristics associated with the user and maintained by the online system 140. The option to modify characteristics compared to targeting criteria may be presented along with a content item or may be presented in conjunction with information from a user's user profile.

From the interface, the user provides input to the online system 140 indicating whether various characteristics may be compared to targeting criteria included in content items to identify content items eligible for presentation to the user. For example, the user selects characteristics that the online system 140 is authorized to compare to targeting criteria included in content items; the online system 140 compares the characteristics selected by the user to targeting criteria included in content items but does not compare characteristics not selected by the user to targeting criteria included in content items. Alternatively, the user selects characteristics that the online system 140 is not authorized to compare to targeting criteria included in content items; the online system 140 compares the characteristics not selected by the user to targeting criteria included in content items but does not compare characteristics selected by the user to targeting criteria included in content items. Additionally, the interface identifying characteristics may identify additional characteristics for the user to provide to the online system 140 for association with the user. The additional characteristics may be determined based on collaborative filtering, correlation between a characteristic associated with the user and characteristics associated with other users also associated with the characteristic, based on characteristics satisfying additional targeting criteria included in content items also including targeting criteria satisfied by a characteristic of the user, application of one or more models to characteristics of the user and characteristics of other users, or any other suitable information. The user may select an additional characteristic for the online system 140 to maintain in association with the user, allowing the additional characteristic to be compared to targeting criteria associated with content items.

Example User Interfaces

Figure 4A:
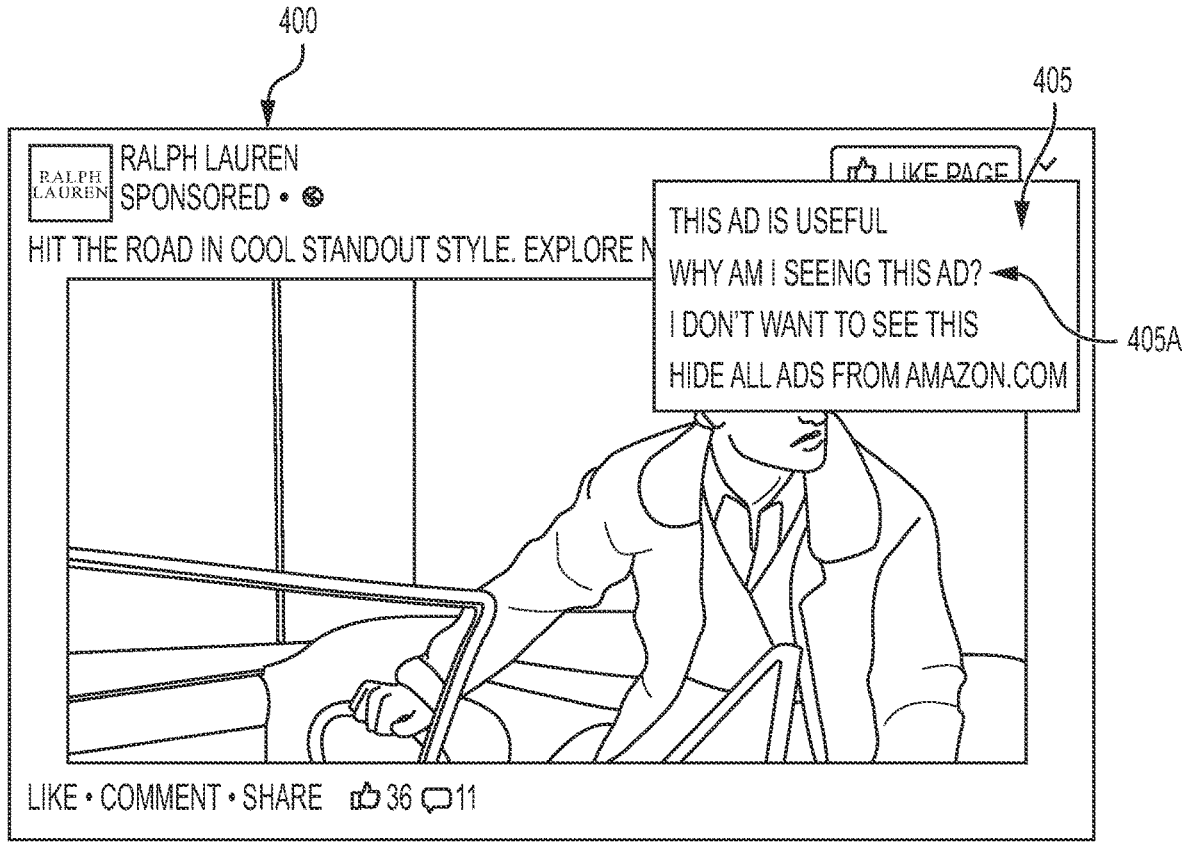
FIGS. 4A and 4B are example user interfaces presented to an online system user to modify characteristics of the user authorized to be used for selecting content, in accordance with an embodiment.
Figure 4B:
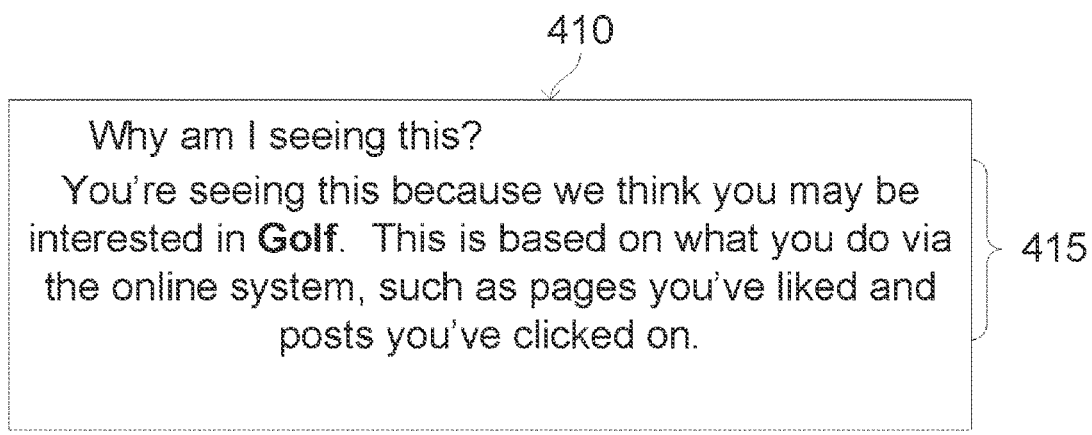

FIGS. 4A and 4B are example user interfaces presented to an online system user to modify characteristics of the user authorized to be used for selecting content. In the example of FIG. 4A, content 400 is presented along with various options 405 to present information associated with the content 400 or to provide feedback to the online system 140 regarding the content 400. Included in the options 405 is an option 405A to view one or more reasons the content 400 is presented to the user. Other options 405 presented to the user may include an option to indicate to the online system 140 that the content 400 is useful to the user, an option to hide the content 400 from presentation to the user, and an option to prevent presentation of additional content associated with a user associated with the content 400. In various embodiments, the options 405 may be presented in response to a user interaction with the content 400 (e.g., accessing a specific interface element or portion of the content 400) or may be automatically presented to the user by the online system 140.

Referring to FIG. 4B, if the user selects the option 405A to view one or more reasons the content 400 was presented, an interface 410 describing the one or more reasons is presented. The interface 410 may be presented in conjunction with the content 400 or may be presented in place of the content 400. The interface 410 includes a description 415 identifying a characteristic of the user satisfying targeting criteria associated with the content 400, with the characteristic selected as described above in conjunction with FIG. 3. In some embodiments, the interface 410 presents an option allowing the user to prevent subsequent user of the characteristic identified in the description 415 by the online system 140 to select content for the user. For example, the option identifies the selected characteristic and includes an interface element (e.g., a radio button, a check box) with different states corresponding to authorizing the online system 140 to use the characteristic when selecting content and preventing the online system 140 from using the characteristic when selecting content. Accessing the interface element changes the state of the interface element, which modifies whether the online system 140 is authorized to use the characteristic identified by the interface 410 when subsequently selecting content for the user. For example, a state of the interface element indicates the characteristic identified by the interface is authorized for use in selecting content, while an alternative state of the interface element indicates the characteristic is prevented from being used in selecting content. Interacting with the interface element allows the user to communicate information to the online system specifying whether the characteristic is authorized for use in selecting content for presentation to the user or whether the characteristic is prevent from use in selecting subsequent content for presentation to the user.

Figure 5A:
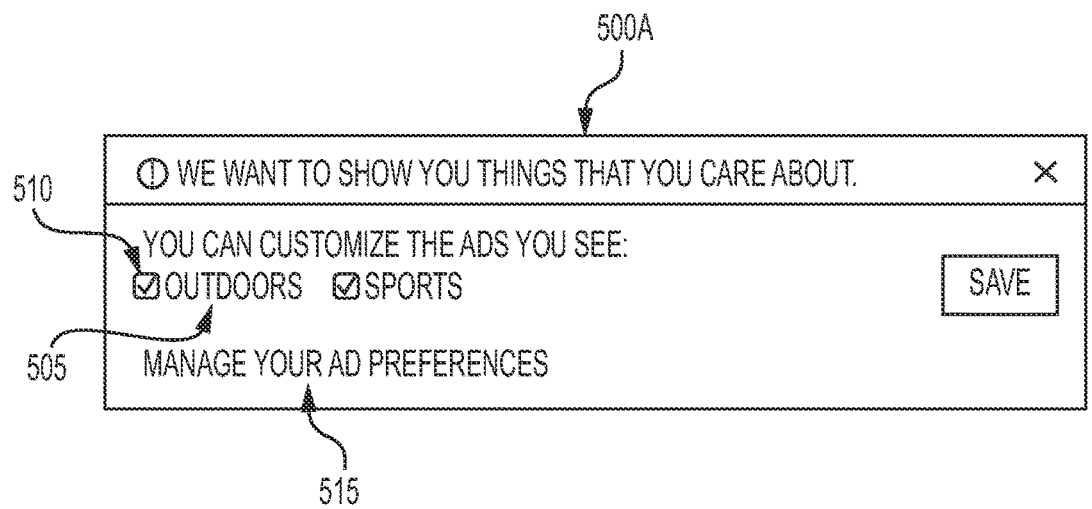
FIGS. 5A and 5B are example interfaces identifying characteristics associated with the user by the online system and options for a user to modify characteristics of the user authorized for use in selecting content, in accordance with an embodiment.
Figure 5B:
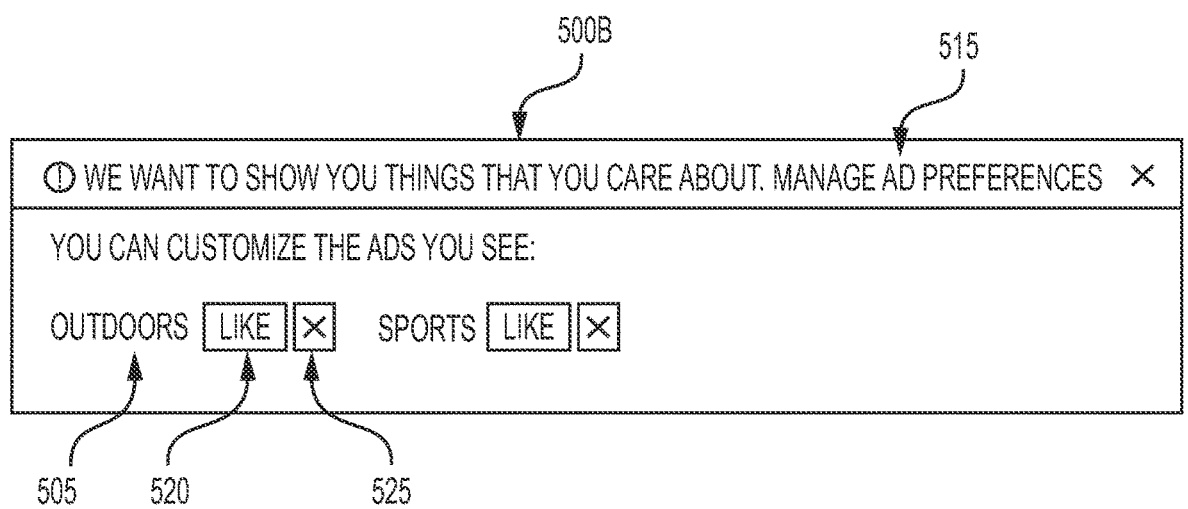

In various embodiments, the interface 410 shown in FIG. 4B also includes an option to modify characteristics of the user compared to targeting criteria included in content items. When the online system 140 receives a selection of the option to modify characteristics compared to targeting criteria, the online system 140 presents an interface including characteristics associated with the user and maintained by the online system 140. The presented interface may also include additional characteristics for association with the user, such as characteristics the online system 140 determined based on collaborative filtering, correlation between a characteristic associated with the user and characteristics associated with other users also associated with the characteristic, based on characteristics satisfying additional targeting criteria included in content items also including targeting criteria satisfied by a characteristic of the user, application of one or more models to characteristics of the user and characteristics of other users, or any other suitable information. FIGS. 5A and 5B show example interfaces 500A, 500B identifying characteristics 505 associated with the user by the online system 140. Interface 500A presents a check box 510 associated with a characteristic 505 associated with the user having a state indicating the characteristic 505 is authorized for use in selecting content and having an alternative state indicating the characteristic 505 is prevented from being used in selecting content. Interacting with the check box 510 allows the user to communicate information to the online system 140 specifying whether the characteristic 505 is authorized for use in selecting content for presentation to the user or whether the characteristic is prevent from use in selecting subsequent content for presentation to the user by changing the state of the check box 510. Interface 500B presents an interface element 520 and an alternative interface element 525 in association with the characteristic 505. Interacting with the interface element 520 allows the user to authorize the online system 140 to use the characteristic in selecting content for presentation to the user, while interacting with the alternative interface element 525 allows the user to prevent the online system 140 from using the characteristic 505 in selecting content for presentation to the user. However, in other embodiments, the online system 140 may present an interface including any suitable interface element or elements associated with the characteristic 505, allowing the user to modify whether the online system 140 is authorized to use the characteristic 505 when selecting content for the user.

One or more additional characteristics may be presented by interfaces 500A, 500B in conjunction with the one or more selected characteristics. As described above, the additional characteristics may be determined based on collaborative filtering, correlation between a characteristic associated with the user and characteristics associated with other users also associated with the characteristic, based on characteristics satisfying additional targeting criteria included in content items also including targeting criteria satisfied by a characteristic of the user, application of one or more models to characteristics of the user and characteristics of other users, or any other suitable information. Additional characteristics presented by the interface 500A or by the interface 500B may be selected as the selected characteristics are selected. For example, as described above in conjunction with FIG. 3, additional characteristics presented by the interface 500A or by the interface 500B may be determined by ranking various additional characteristics based on user feedback, based on revenue received by the online system from presenting content items associated with targeting criteria specifying different additional characteristics, based on a number of users associated with different additional characteristics, based on accuracy of one or more models generating different additional characteristics, or based on any other similar information. Also as described above in conjunction with FIG. 3, the additional characteristics presented by the interface 500A or by the interface 500B may be determined based on amounts of revenue received by the online system 140 from content items having targeting criteria specifying different additional characteristics, numbers of users associated with different additional characteristics, accuracy of models determining whether users have different additional characteristics, numbers of users from whom models determining additional characteristics have obtained information, or any other suitable information. Hence, interface 500A or interface 500B may identify a limited number of additional characteristics along with the selected characteristics to allow the user to more easily identify and associate the additional characteristics with the user or indicate that the additional characteristics are not associated with the user.

Additionally, in the examples of FIGS. 5A and 5B, interfaces 500A, 500B each include an interface element 515 that identifies various other characteristics for the user to identify to the online system for association with the user and whether the online system 140 is authorized to use one or more of the other characteristics when selecting content for the user. The additional characteristics may be determined based on collaborative filtering, correlation between a characteristic associated with the user and characteristics associated with other users also associated with the characteristic, based on characteristics satisfying additional targeting criteria included in content items also including targeting criteria satisfied by a characteristic of the user, or any other suitable information. The user may select an additional characteristic by interacting with an interface element presented in conjunction with each additional characteristic to maintain in association with the user, allowing the additional characteristic to be compared to targeting criteria associated with content items.

SUMMARY

The foregoing description of embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of embodiments is intended to be illustrative, but not limiting, of the scope of the patent rights, which is set forth in the following claims.

What is claimed is:

1. A system, comprising:
    a processor;
    a memory storing instructions, which when executed by the processor, cause the processor to:
        select digital content for presentation to a user based on user characteristics satisfying at least a threshold value associated with a content item in the digital content by:
            identifying one or more models to determine whether users have at least one of the user characteristics via the one or more models that satisfy the threshold value associated with the content item in the digital content;
            determining, for each of the one or more models, an accuracy value for the model, wherein the accuracy value represents a likelihood users have one or more of the user characteristics via the one or more models to satisfy the threshold value associated with the content item in the digital content;
            identifying a set of user characteristics via one or more models having less than a threshold accuracy value; and
            selecting one or more of the identified set of user characteristics, wherein selecting one or more of the identified set of user characteristics comprises:
                receiving a ranking of the identified set of user characteristics satisfying the threshold value included in the content item; and
                present, to the user at a client device, the digital content having the content item and a description of the set of user characteristics the one or more models determined to have less than the threshold accuracy value.

2. The system of claim 1, wherein selecting one or more of the identified set of user characteristics further comprises:
    selecting the one or more of the identified set of user characteristics based at least in part on the received ranking.

3. The system of claim 2, wherein selecting the one or more of the identified set of user characteristics is based at least in part on a maximum ranking.

4. The system of claim 2, wherein selecting the one or more of the identified set of user characteristics is based at least in part on a minimum threshold ranking.

5. The system of claim 2, wherein the ranking of the identified set of user characteristics is based at least in part on an amount of revenue associated with presenting content items in the digital content specifying one or more of the identified set of user characteristics.

6. The system of claim 5, wherein the amount of revenue is determined by an online system associated with presenting the selected digital content to users.

7. The system of claim 1, further comprising:
    providing an option to modify the user characteristics associated with the user;
    presenting one or more additional characteristics associated with the user in response to receiving an instruction to modify the user characteristics associated with the user;
    comparing the one or more additional characteristics with the selected user characteristics satisfying at least the threshold value associated with the content item in the digital content; and
    using information associated with the comparison to update the user characteristics satisfying at least the threshold value associated with the content item in the digital content.

8. A method, comprising:
    selecting, by a processor of an online system, digital content for presentation, by the online system, to a user based on user characteristics satisfying at least a threshold value associated with a content item in the digital content by:
        identifying one or more models to determine whether users have at least one of the user characteristics via the one or more models that satisfy the threshold value associated with the content item in the digital content;

determining, for each of the one or more models, an accuracy value for the model, wherein the accuracy value represents a likelihood users have one or more of the user characteristics via the one or more models to satisfy the threshold value associated with the content item in the digital content;

identifying a set of user characteristics via one or more models having less than a threshold accuracy value; and selecting one or more of the identified set of user characteristics, wherein selecting one or more of the identified set of user characteristics comprises:

receiving a ranking of the identified set of user characteristics satisfying the threshold value included in the content item; and presenting, by the processor of the online system to the user at a client device, the digital content having the content item and a description of the set of user characteristics the one or more models determined to have less than the threshold accuracy value.

9. The method of claim 8, wherein selecting one or more of the identified set of user characteristics further comprises:

selecting the one or more of the identified set of user characteristics based at least in part on the received ranking.

10. The method of claim 9, wherein selecting the one or more of the identified set of user characteristics is based at least in part on a maximum ranking.

11. The method of claim 9, wherein selecting the one or more of the identified set of user characteristics is based at least in part on a minimum threshold ranking.

12. The method of claim 9, wherein the ranking of the identified set of user characteristics is based at least in part on an amount of revenue associated with presenting content items in the digital content specifying one or more of the identified set of user characteristics.

13. The method of claim 12, wherein the amount of revenue is determined by the online system associated with presenting the selected digital content to users.

14. The method of claim 8, further comprising:

providing an option to modify the user characteristics associated with the user;

presenting one or more additional characteristics associated with the user in response to receiving an instruction to modify the user characteristics associated with the user;

comparing the one or more additional characteristics with the selected user characteristics satisfying at least the threshold value associated with the content item in the digital content; and using information associated with the comparison to update the user characteristics satisfying at least the threshold value associated with the content item in the digital content.

15. A non-transitory computer-readable storage medium storing instructions, which when executed cause a processor to:

select, by an online system, digital content for presentation, by the online system, to a user based on user characteristics satisfying at least a threshold value associated with a content item in the digital content by:

identifying one or more models to determine whether users have at least one of the user characteristics via the one or more models that satisfy the threshold value associated with the content item in the digital content;

determining, for each of the one or more models, an accuracy value for the model, wherein the accuracy value represents a likelihood users have one or more of the user characteristics via the one or more models to satisfy the threshold value associated with the content item in the digital content;

identifying a set of user characteristics via one or more models having less than a threshold accuracy value; and selecting one or more of the identified set of user characteristics, wherein selecting one or more of the identified set of user characteristics comprises:

receiving a ranking of the identified set of user characteristics satisfying the threshold value included in the content item; and presenting, by the processor of the online system to the user at a client device, the digital content having the content item and a description of the set of user characteristics the one or more models determined to have less than the threshold accuracy value.

16. The non-transitory computer-readable storage medium of claim 15, wherein selecting one or more of the identified set of user characteristics further comprises: selecting the one or more of the identified set of user characteristics based at least in part on the received ranking.

17. The non-transitory computer-readable storage medium of claim 16, wherein selecting the one or more of the identified set of user characteristics is based at least in part on a maximum ranking.

18. The non-transitory computer-readable storage medium of claim 16, wherein selecting the one or more of the identified set of user characteristics is based at least in part on a minimum threshold ranking.

19. The non-transitory computer-readable storage medium of claim 16, wherein the ranking of the identified set of user characteristics is based at least in part on an amount of revenue associated with presenting content items in the digital content specifying one or more of the identified set of user characteristics.

20. The non-transitory computer-readable storage medium of claim 19, wherein the amount of revenue is determined by the online system associated with presenting the selected digital content to users.

* * * * *